United States Patent
Prayaga et al.

(10) Patent No.: US 11,777,984 B1
(45) Date of Patent: Oct. 3, 2023

(54) AUTOMATIC THREAT DETECTION AND REMEDIATION

(71) Applicant: Wells Fargo Bank, N.A., San Francisco, CA (US)

(72) Inventors: Divakar Sastry Prayaga, Bangalore (IN); Rajasekhar Kode, Secunderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 234 days.

(21) Appl. No.: 17/013,285

(22) Filed: Sep. 4, 2020

(51) Int. Cl.
 *H04L 9/40* (2022.01)
 *G06F 8/65* (2018.01)
(52) U.S. Cl.
 CPC ............ *H04L 63/1441* (2013.01); *G06F 8/65* (2013.01); *H04L 63/1416* (2013.01); *H04L 63/1425* (2013.01)
(58) Field of Classification Search
 CPC ............ H04L 63/1441; H04L 63/1416; H04L 63/1425
 USPC .......................................................... 726/23
 See application file for complete search history.

(56) References Cited

U.S. PATENT DOCUMENTS

| | | | | |
|---|---|---|---|---|
| 6,898,715 B1 * | 5/2005 | Smithson | ................ | H04L 51/08 714/33 |
| 7,949,329 B2 * | 5/2011 | Benco | ................ | H04W 12/128 455/410 |
| 8,171,554 B2 * | 5/2012 | Elovici | ................ | H04L 41/147 713/181 |
| 8,214,904 B1 * | 7/2012 | Doukhvalov | .......... | G06Q 10/10 726/26 |
| 8,214,905 B1 * | 7/2012 | Doukhvalov | ........... | H04L 63/20 726/24 |
| 8,495,743 B2 * | 7/2013 | Kraemer | ............. | H04L 63/1416 726/25 |
| 8,739,288 B2 * | 5/2014 | Diamant | ............. | H04L 63/1433 726/25 |
| 8,819,823 B1 * | 8/2014 | Banerjee | ............. | H04L 63/1441 719/311 |
| 9,854,057 B2 * | 12/2017 | Chari | ................... | H04L 63/1466 |
| 10,225,269 B2 * | 3/2019 | Yi | ........................... | G06F 16/22 |
| 10,346,615 B2 * | 7/2019 | Sukhomlinov | ......... | G06F 21/50 |
| 10,419,931 B1 * | 9/2019 | Sohail | ................ | H04L 63/1425 |
| 10,476,891 B2 * | 11/2019 | Vissamsetty | ........ | H04L 63/1491 |
| 11,100,232 B1 * | 8/2021 | Juncker | ................ | H04L 63/102 |
| 11,108,790 B1 * | 8/2021 | Deardorff | ............... | G06F 21/53 |
| 2005/0015760 A1 * | 1/2005 | Ivanov | ...................... | G06F 8/65 717/174 |
| 2014/0201836 A1 * | 7/2014 | Amsler | ................... | H04L 63/20 726/23 |

* cited by examiner

*Primary Examiner* — Badri Narayanan
(74) *Attorney, Agent, or Firm* — Kilpatrick Townsend & Stockton LLP

(57) ABSTRACT

Threats to systems and data captured by such systems can be automatically detected and remediated. Inbound traffic on an enterprise network can be monitored and analyzed to detect a threat based on parameters of the inbound traffic. In response, a patch can be identified or generated to address known or unknown threats based on a comparison of parameters. Once identified or generated, the patch can be conveyed to a target computing resource for deployment to address the threat.

15 Claims, 7 Drawing Sheets

AUTOMATIC THREAT DETECTION AND REMEDIATION

BACKGROUND

Computing systems associated with enterprises and organizations, such as financial institutions, have long-standing exposure to threats. Many measures are put in place to secure systems and data. Nevertheless, technology advancements cause systems to become vulnerable to threats including fraudulent activities. Cyber criminals continue to develop sophisticated strategies to attack computer systems for malicious and exploitive purposes. Consequently, enterprises and organizations, including financial institutions, are involved in a continuous process of improving security by introducing new strategies and tools in systems.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automatic threat detection and remediation. The presence of a threat can be identified by monitoring and analyzing enterprise network traffic. A known or unknown threat can be detected based on one or more parameter values associated with threat history, central processing unit usage, network performance, and memory consumption trend, among other things. If the threat is known, a corresponding patch can be identified and deployed. In one instance the patch can be identified in a database by matching parameter values of the threat to parameter values of known threats and corresponding patches in the database. If the threat is unknown, a new patch can be automatically generated based on one or more patches associated with known, similar threats. A new patch can be modified automatically or manually until patch efficacy and performance are acceptable. Subsequently, the new patch can be deployed and saved for potential employment in conjunction with remediating subsequent threats.

In accordance with one aspect, a system is disclosed that comprises a processor coupled to a memory that includes instructions, that when executed by the processor, cause the processor to detect a threat based on analysis of one or more parameter values of inbound traffic to an enterprise network, determine a patch automatically that at least mitigates the threat on a computing resource in the enterprise network, and convey the patch to the computing resource for application. Instructions can further cause the processor to determine the patch by matching at least one of the one or more parameter values of the inbound traffic to one or more parameter values of a known threat and corresponding patch. In another instance, the instructions cause the processor to automatically generate the patch for an unknown threat based at least on one patch associated with a known threat. The at least one patch can be identified based on similarity of the unknown threat with the known threat, and the similarity can be determined based on comparison of the one or more parameter values associated with the unknown threat with one or more parameter values of the known threat. The instructions can further cause the processor to evaluate effectiveness of the patch with respect to the threat, notify a user when the effectiveness is below a predetermine threshold, and update the patch based on received input from the user. Further, the instructions can cause the processor to analyze the inbound traffic in a test environment separate from the computing resource and detect the threat prior to the threat affecting the computer resource. In one implementation, the computer resource can correspond to a server and the patch can be deployed on a server kernel.

In accordance with another aspect, a method is disclosed that comprises monitoring inbound traffic to an enterprise network, detecting a threat based on analysis of one or more parameter values of the inbound traffic, determining a patch that at least mitigates the threat on a computing resource in the enterprise network, and providing the patch to the computing resource for deployment of the patch on the computing resource. Determining the patch can further comprise matching at least one of the one or more parameter values of the inbound traffic to a threat and corresponding patch. Further, the method comprises generating the patch for an unknown threat from at least one patch associated with a known threat. The method further comprises identifying one or more parameter values associated with the at least one patch, computing a similarity score based on a result of a comparison of the one or more parameter values associated with the threat and the one or more parameter values associated with the at least one patch, and determining the at least one patch based on comparison of the similarity score to a predetermine threshold. The method also comprises predicting effectiveness of the patch with respect to the threat, notifying a user when the effectiveness is below a predetermined threshold, and updating the patch based on input received from the user. In one implementation the method can also comprise analyzing the inbound traffic in a test environment separate from the computing resource.

In accordance with yet another aspect, a method is disclosed that executes, on a processor, instructions that cause the processor to perform operations comprising monitoring inbound traffic to an enterprise network, detecting presence of an unknown threat, prior to the unknown threat impacting an enterprise server, based on analysis of values of one or more parameters of the inbound traffic, identifying at least one patch associated with a threat with similar parameter values, generating a patch based on the at least one patch to address the unknown threat, and conveying the patch for application on a kernel of an enterprise server. The operations can further comprise predicting effectiveness of the generated patch with respect to the threat, notifying a user when the effectiveness is below a predetermined threshold, and updating the patch based on input received from the user.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Financial institutions, as well as other enterprises and organizations, are involved in a continuous process of improving computer system security by introducing new strategies and tools. Timely adjustment of security strategies is needed to address a rapidly changing stream of threats. However, the processes around these strategies are manual and very time consuming. Slow release of security strategies leaves financial institutions systems and data vulnerable, which is problematic.

Details provided herein generally pertain to automatic threat detection and remediation. Inbound traffic in a network can be monitored and analyzed to detect the presence of a known or unknown threat based on one or more parameters such as threat history, central processor usage, network performance, and memory consumption trends, among others. A patch for a known threat can be identified and applied to address a detected known threat. In the case of an unknown threat, the impact of the unknown threat can be learned based on parameter values. More particularly, one or more similar known threats can be identified based on matching parameter values of an unknown threat against parameter values of known threats. A patch can be generated based on patches associated with one or more known similar threats. A computer resource such as a computer operating system kernel can be updated or upgraded with a customized patch that addresses the threat. In essence, a threat can be automatically detected and remediated by self-learning and self-healing processes. Further, in one instance, threat detection can occur prior to the threat impacting a computer resource and remediation can be performed proactively to enable the computer resource to avoid the threat. In some situations, an automatically generated patch can be provided to a user for approval prior to application or input can be solicited from a user if effectiveness or performance of an automatically generated patch is deemed below a predetermined threshold. In this manner, manual intervention can be limited, if not eliminated, from threat detection and remediation.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
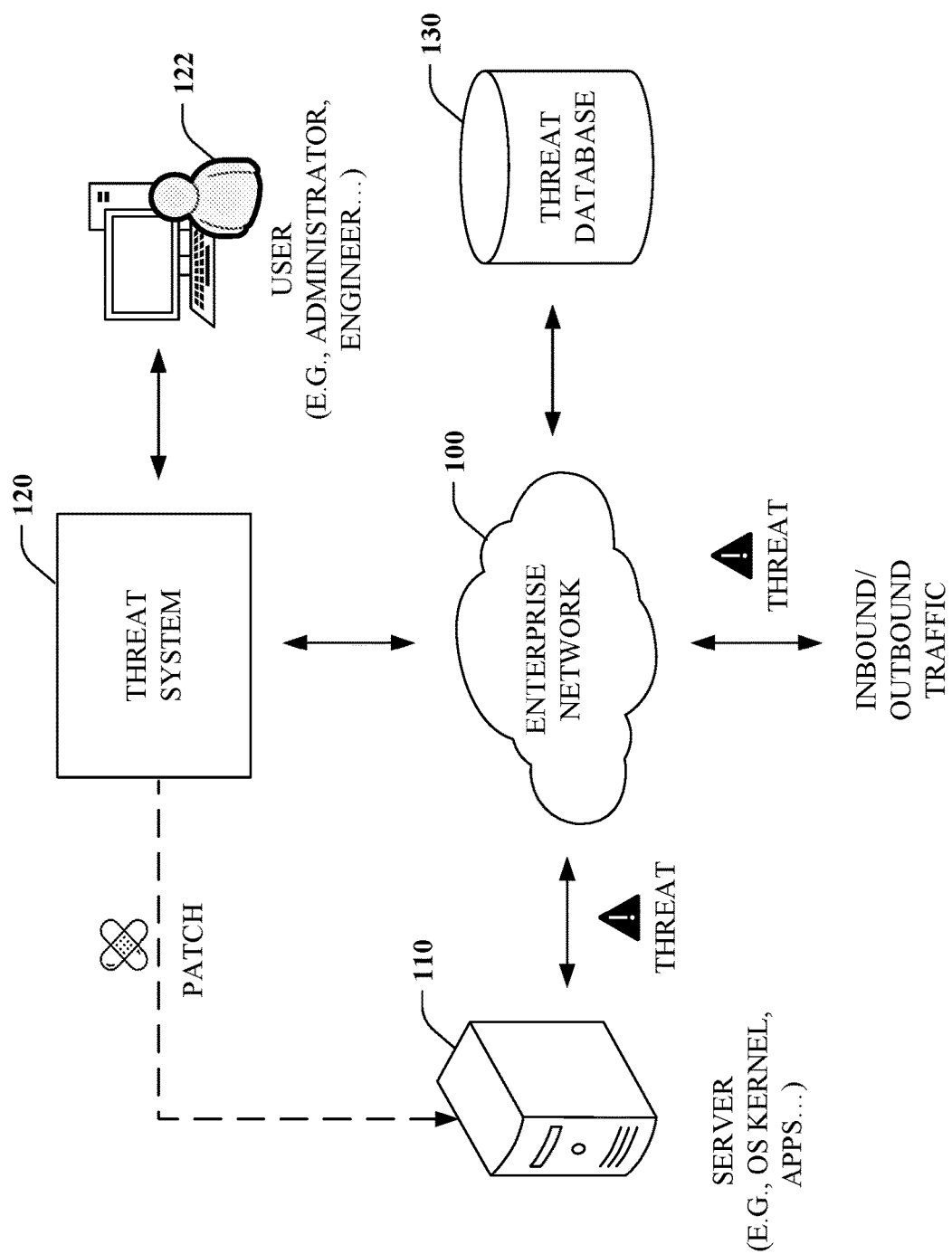
FIG. 1 illustrates an overview of an example implementation.

Referring initially to FIG. 1, a high-level overview of an example implementation is illustrated and described. As depicted, the implementation includes enterprise network 100, server 110, threat system 120, and threat database 130.

The enterprise network 100 can include a local area network (LAN) and wide area network (WAN) that provides a communication framework, including supporting hardware (e.g., routers, modems, gateways, cables . . . ), that enables connection and communication of computing resources of an enterprise or other organization. Here, the enterprise network 100 connects and enables communication between computing resources of an enterprise including the server 110, threat system 120, and threat database 130. Further, the enterprise network 100 can receive inbound, as well as send outbound, network traffic, to enable communication outside the enterprise network 100. Accordingly, the enterprise network 100 can send and receive communications to facilitate interaction with computing devices of customers.

The server 110 is a piece of hardware, software (e.g. virtual server), or a combination of hardware and software that provides functionality, or services, to customers outside the enterprise in accordance with a client-server architecture. For example, the server 110 can be comprised of hardware (e.g., central processing unit, memory . . . ), an operating system including a kernel, and one or more applications that interact with the hardware through the operating system kernel. In one instance, the server 110 can correspond to a financial institution server that provides banking services to customers. For example, the server 110 can provide computing resources, such as memory or computation, to support a mobile banking application or mobile banking website, or other service. Due to the financial nature of the server 110 and data associated with the server 110, the server 110 can be a target for attack. For example, a malicious hacker may seek to expose vulnerability in server hardware or software to perform fraudulent transactions.

The threat system 120 comprises hardware, software, or a combination of hardware and software configured to detect and remedy a threat associated with the server 110. A threat is any circumstance or event with the potential to cause harm to the server 110 or other systems of the enterprise. In one instance, the threat system 120 can monitor and analyze inbound, or incoming, network traffic for potential threats. In accordance with one embodiment, the threat system 120 can seek to determine values of parameters associated with an action including central processor usage, network performance, and memory consumption, among others. In accordance with one embodiment the threat system 120 can operate in a test environment separate from the server 110 to determine the parameter values associated with particular threats. The threat system 120 can compare the parameter values with parameter values of other known threats stored in the threat database 130.

The threat database 130 can comprise a set of threat definitions, including parameter values and actions or patches that remedy the threat, accessible over the enterprise network 100. If a known threat is detected, the threat system 120 can query the threat database 130 and retrieve a patch for the known threat. The patch can subsequently be provided and applied to the server 110 to at least mitigate, if not eliminate, the impact of the known threat.

If the threat is unknown, the threat system 120 can identify similar threats and responses from the threat database 130 based on parameter values. The threat system 120 can automatically generate a novel patch based on the patches associated with similar threats. The patch can be executed by the threat system 120 in a test environment to determine or predict the effectiveness of the generated patch. If the patch is effective, meaning an effectiveness score exceeds a predetermined threshold value, the patch can be applied to the server 110. Alternatively, the threat system 120 can solicit information from a user 122, such as a threat administrator or engineer, by way of a computing device of the user 122 to increase the effectiveness at least when a score is below a predetermined threshold value. Further, a generated patch can be provided to a user for approval prior to application to the server 110. A threat definition, or profile, comprising identified parameter values and a corresponding patch can be saved to the threat database 130 for subsequent employment to inform decisions and aid generation of future patches.

In one instance, the identified or generated patch can update a kernel of the server 110. A kernel is a computer program at the center of an operating system that provides control over substantially everything on the server 110. More particularly, the kernel is the portion of an operating system that is always resident in memory and facilities interaction between hardware and software. A patch can be applied to the kernel, in one instance, or higher in a software stack such as the application layer. However, modifications to the kernel effect all applications since applications employ the kernel.

A patch can be applied prior to a threat affecting the server 110 or after the threat has already affected the server 110. If the patch is applied prior to the threat impacting the server 110, the patch can be said to be providing protection against the threat. In other words, identification or generation of a patch is analogous to developing a vaccine and deploying the vaccine to protect the server 110 from a threat. By contrast, if a threat has already impacted the server 110, the patch can be said to heal the server 110 by removing or at least mitigating the effects of the threat. Herein, detecting and applying patches to address a threat on a server can be said to be a self-healing process.

In accordance with one aspect, the threat system 120, or another system, can be positioned as an intermediary between the server 110 and inbound network traffic. In this manner, the network traffic can be screened for threats prior to the threats reaching the server. Moreover, the threat system 120 can identify or generate a patch proactively before the threat has an opportunity to harm the server 110. Of course, the threat system 120 can also be reactive in responding to a prior attack on the server 110.

Figure 2:
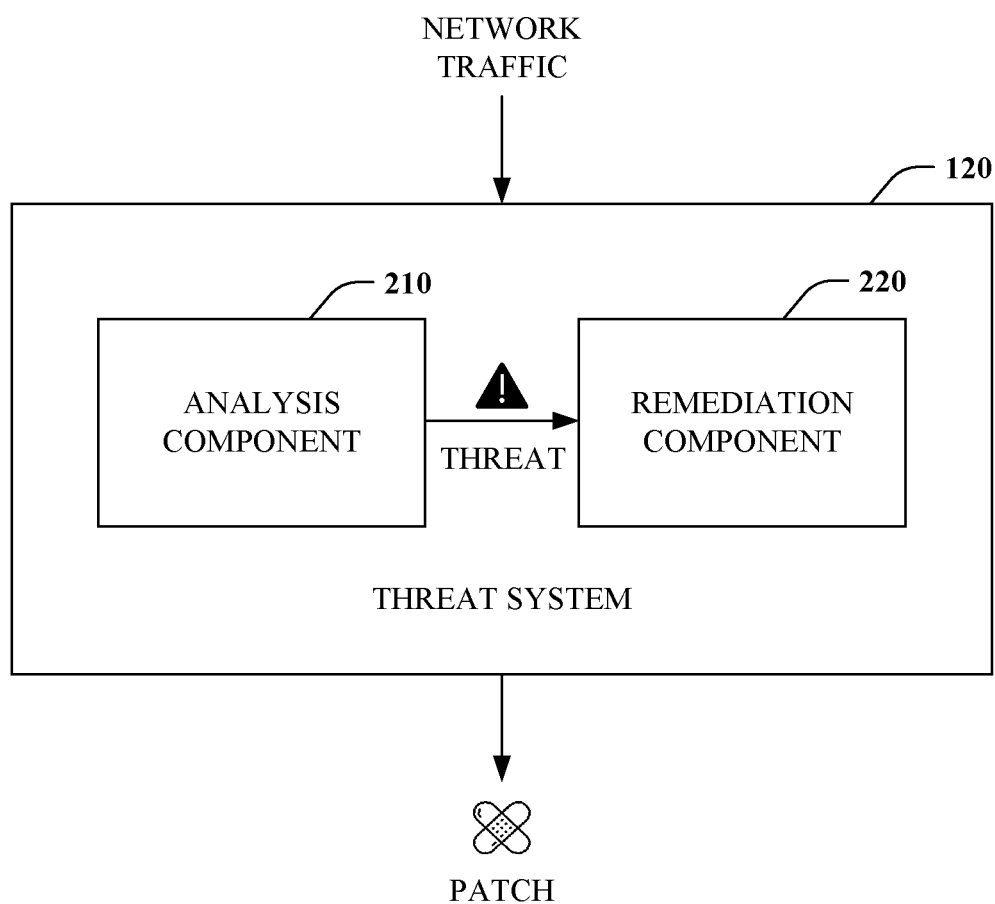
FIG. 2 is a block diagram of a sample system that detects and remediates threats.

Turning attention to FIG. 2, the threat system 120 is illustrated in further sample detail. The threat system 120 is configured to detect and at least mitigate a threat associated with a server such as one associated with a financial institution. As shown, the threat system 120 includes analysis component 210 and remediation component 220. In accordance with one embodiment, these are computer executable components that, when executed by a processor, cause the processor to implement the functionality of the threat system 120 in conjunction with other computing hardware. Alternatively, the analysis component 210 and the remediation component 220 can correspond to computer appliances with hardware and software specifically designed to provide corresponding functionality, or the components can be integrated within a system on a chip architecture.

The analysis component 210 is configured to monitor and analyze network traffic in an effort to detect threats to a system such as a server of a financial institution. A threat is any circumstance or event with the potential to cause harm to the server 110 or other systems of the enterprise and can be intentional or accidental. An intentional threat corresponds to deliberate actions of a malicious individual or group, for example for purposes of spying or illegal processing of data. An accidental threat can be due to hardware or software failure, physical damage (e.g., fire, water . . . ), or human error, among other things. In one embodiment the analysis component 210 can operate in a testing environment separate from a production environment. In the testing environment, determinations can be made regarding how network traffic affects a system. A threat can be detected by, and characterized through, computing parameter values associated with impact to a system including central processor usage, network performance, and memory consumption, among others. Based on comparison of the values of such parameters to predetermined threshold values associated with typical operation or comparison to known threats, the analysis component 210 can determine or infer the presence of a threat. The remediation component 220 can be triggered by detection of a threat by the analysis component 210.

The remediation component 220 is configured to remedy or at least mitigate effects of a threat on a system. Such remediation action can be accomplished by identification or generation of a patch or like mechanism. A patch can be a set of changes to a computer program, such as an operating system kernel, or supporting data to fix security vulnerabilities or other bugs. The remediation component 220 can utilize parameter values associated with a threat to identify or generate a patch to address the threat. For example, parameter values can form part of a threat definition and corresponding patch in a threat database. Accordingly, the remediation component 220 can utilize the parameter values to look up a known threat in a threat database and acquire a corresponding patch to protect against or remove the known threat or effects of the threat. For an unknown threat, the parameter values can be utilized to look up similar threats and associated patches in a threat database. From at least one of the similar threats a patch can be generated that is likely to remedy the unknown threat. For example, if the unknown threat impacts bandwidth in a similar manner as a known threat, at least a portion of a corresponding patch can be utilized to generate a new patch for the unknown threat. A generated patch can subsequently be applied to a system to protect the system against the threat or remove the threat, or in other words, heal the system.

In various embodiments, the generated patch may heal the system without necessarily protecting the system against future attacks. For instance, an attack that diminishes CPU resources may be patched by executing a command that temporarily adds CPU resources from an external system. The purpose being that the patch may allow the system to continue functioning until the threat can be neutralized.

Figure 3:
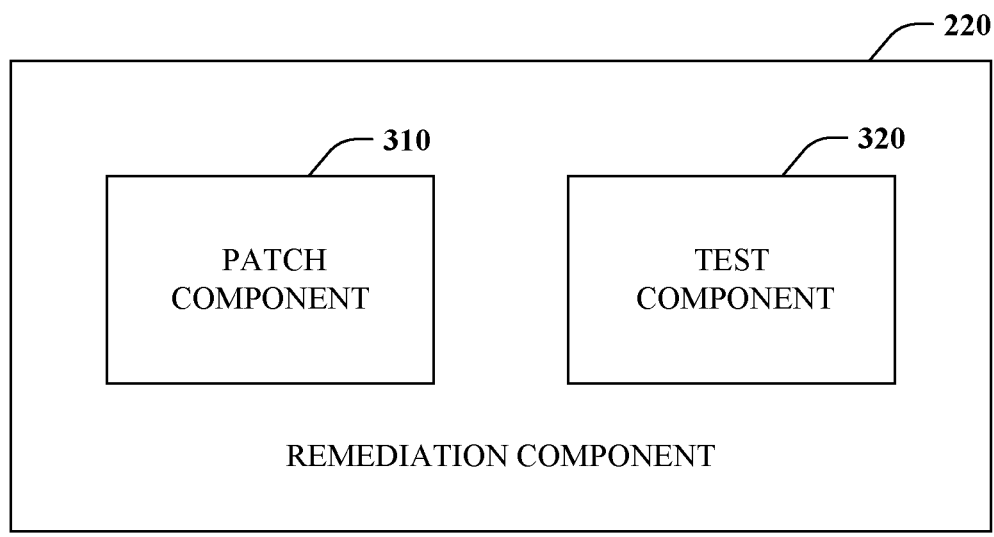
FIG. 3 is a block diagram of a sample remediation component.

FIG. 3 illustrates the remediation component 220 in further sample detail by way of a block diagram. The remediation component 220 includes the patch component 310 and the test component 320. The patch component 310 is configured to identify or generate a patch for a known or unknown threat. The patch component 310 can utilize parameter values associated with a threat such as central processor usage, network performance, and memory consumption, among other things to locate threat definitions in a threat database. The threat definitions can specify a known threat in terms of parameter values and include an associated patch or link to the patch. Consequently, the patch component 310 can look up a threat definition based on parameter values and locate a patch for a known threat. The patch component 310 can also utilize the parameter values to look up similar threats where the threat is unknown. From one or more similar threats and corresponding patches a new patch can be generated. In one instance, the patch component 310 can employ machine learning to generate a patch for an unknown threat. For example, a machine learning model can be developed and trained with historical patches to enable subsequent automatic patch generation.

The test component 320 is configured to evaluate, or test, a newly generated patch. The test component 320 can operate in a test environment that replicates but is different than a production environment. Efficacy of a generated patch to remediate a threat can be evaluated in the test environment. In one instance, a score can be assigned that correlates with the efficacy of the patch to address the threat. Additional aspects can also be tested including whether or not the patch introduces any additional issues, for example that cause applications to malfunction or break. Further, the patch may have issues related to decreased performance or capability. An additional score can be associated with such additional aspects and combine with the efficacy score to produce an overall score associated with the patch. A threshold score can be associated with each of the efficacy score, additional score, or overall score. A comparison can then be performed between a threshold score and corresponding efficacy, additional, or overall scores, and an action can be taken or not taken based on a result of the comparison. For example, if one or all the scores are below a threshold, a user, such as an administrator or others, can be notified and assistance requested. In this manner human assistance can be solicited if a patch is unable to be generated that falls within a certain predetermine threshold in terms of efficacy, additions, or overall. Human intervention can seek to resolve issues associated with an automatically generated patch to resolve the threat. Additionally, or alternatively, such scores can be fed back to the patch component 310 in a feedback loop to enable iterative learning and adjustment to produce a best possible automatic patch addressing a threat. It is also contemplated that any automatically generated patch be approved by a human user prior to application. In this manner, information regarding a patch, including scores, can be provided with a notification to a user with a request for permission to apply the path.

Figure 4:
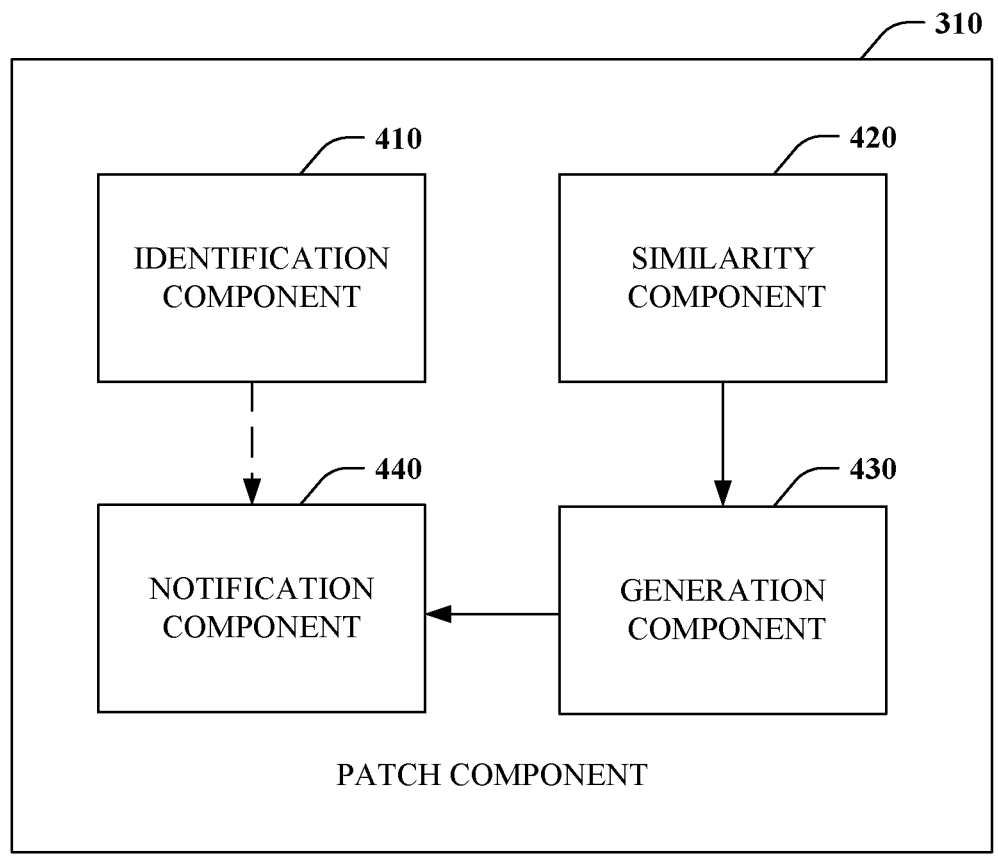
FIG. 4 is a block diagram of a sample patch component.

FIG. 4 depicts the patch component 310 in further sample detail in accordance with one aspect. As shown, the patch component 310 includes identification component 410, similarity component 420, generation component 430, and notification component 440.

The identification component 410 is configured to identify a patch associated with a known threat. In one scenario, the identification component can search a threat database comprising threat definitions and patches to identify a patch. For example, a threat database can be queried based on characteristics of the threat captured by parameter values associated with central processing unit usage and memory consumption, among other things. The result of the query can be a patch or a link to a patch associated with a particular known threat as characterized by way of parameter values. The identified patch can be applied to a system such as a financial institution server to protect the system from the threat or heal the system when affected by the threat.

The similarity component 420 is configured to identify known threats and associated patches that are similar to an unknown threat. Parameter values determined for an unknown threat can be utilized to query a threat database to identify threat definitions with similar parameter values. In one instance, the similarity component 420 can employ a similarity score that correlates with at least the relation between parameter values. The similarity component 420 can also utilize a predetermined threshold value for comparison with the similarity score to ensure that the similarity is within a predetermined range prior to deeming a threat similar. Furthermore, the similarity component 420 need not be limited to parameter values to determine similarity. Rather, the similarity component 420 can also consider other information, such as threat type, in determining similarity, such as, but not limited to, denial of service, privacy breach, identification spoofing, and corruption.

The generation component 430 is configured to generate a patch to address an unknown threat. The generation component 430 can acquire parameter values associated with an unknown threat as well as similar known threats determined by the similarity component 420. From at least one patch associated with a known threat, the generation component 430 can produce a new patch for the unknown threat. For example, consider an unknown threat that affects central processing unit usage and memory consumption. A patch associated with a similar threat that affects central processing unit usage, and patch related to another similar threat that impacts memory consumption can be combined by the generation component 430 to produce a new patch for the unknown threat.

As previously described, the new patch can be tested in a test environment and a score calculated based on an ability of the patch to effectively mitigate the threat and performance impacts of the patch. If the score associated with the new patch is low, reflecting a lack of effectiveness or hinderance to performance, there are a few options. First, the generation component 430 can utilize scoring information to generate an updated patch that can address concerns. The processes of updating a patch and testing can continue iteratively until an effective patch is determined. Alternatively, input from a human user, such as an administrator can be solicited. A human user can update the patch to mitigate the threat more effectively or reduce the performance impact of the patch. At the same time, the human user would not be required to manually generate the patch from scratch thereby reducing the time associated with patch identification or generation, and patch application.

The notification component 440 is configured to notify a user or administrator in conjunction with patch identification and generation. In a scenario in which the generation component 430 is unable to generate a patch at all or cannot automatically generate an acceptable patch that effectively mitigates a threat without hindering system performance, the notification component 440 can be triggered. The notification can initiate contact with a designated individual or group of individuals by way of a communication medium such as an application alert, text message, email, or phone call, among others. Once notified, the individual or group of individuals can manually intervene to generate an appropriate patch, which can be saved in a threat database for later use with respect to other threats. In one embodiment, a patch may need approval prior to application. Accordingly, the notification component 440 can be configured to contact an individual or group of individuals and request approval of the patch and permission to apply the patch to an affected system. This allows a user an opportunity to review the patch prior to application and spot any issues or problems with the patch. In this mode, the threat system can provide a patch tool that automatically generates a patch that can subsequently be approved or modified prior to application.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. For example, the threat system 120 is depicted as separate from a threat database 130. However, in one implementation the threat database 130 can form part of the threat system 120. Communication between systems, components and/or sub-components can be accomplished in accordance with either a push and/or pull control model. Similarly, the threat system 120 is illustrates as separate from the server 110, but alternatively the threat system 120 can be combined with the server 110. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. By way of example, and not limitation, the patch component 310 can utilize such mechanisms to automatically generate a patch for an unknown threat. For instance, the patch component 310 can be trained to automatically generated a patch for a threat given provided characteristics, such as parameter values, as well as other threat patches. The patch component 310 can also continuously learn based on feedback from test results or users. In one particular instance, a classifier can be trained to automatically compute similarity scores and similar threats based on parameter values associated with central processor unit usage and memory consumption, among other things.

Figure 5:
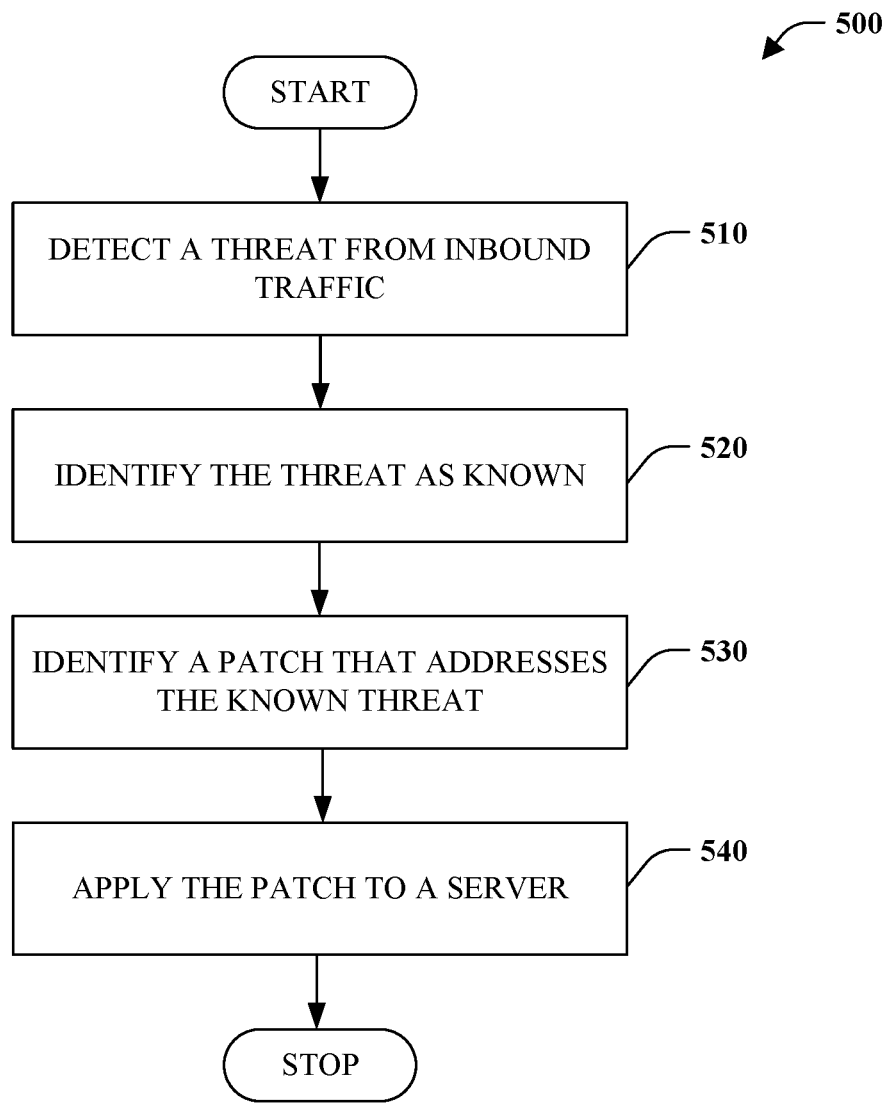
FIG. 5 is a flow chart diagram of a method of threat detection and remediation.
Figure 6:
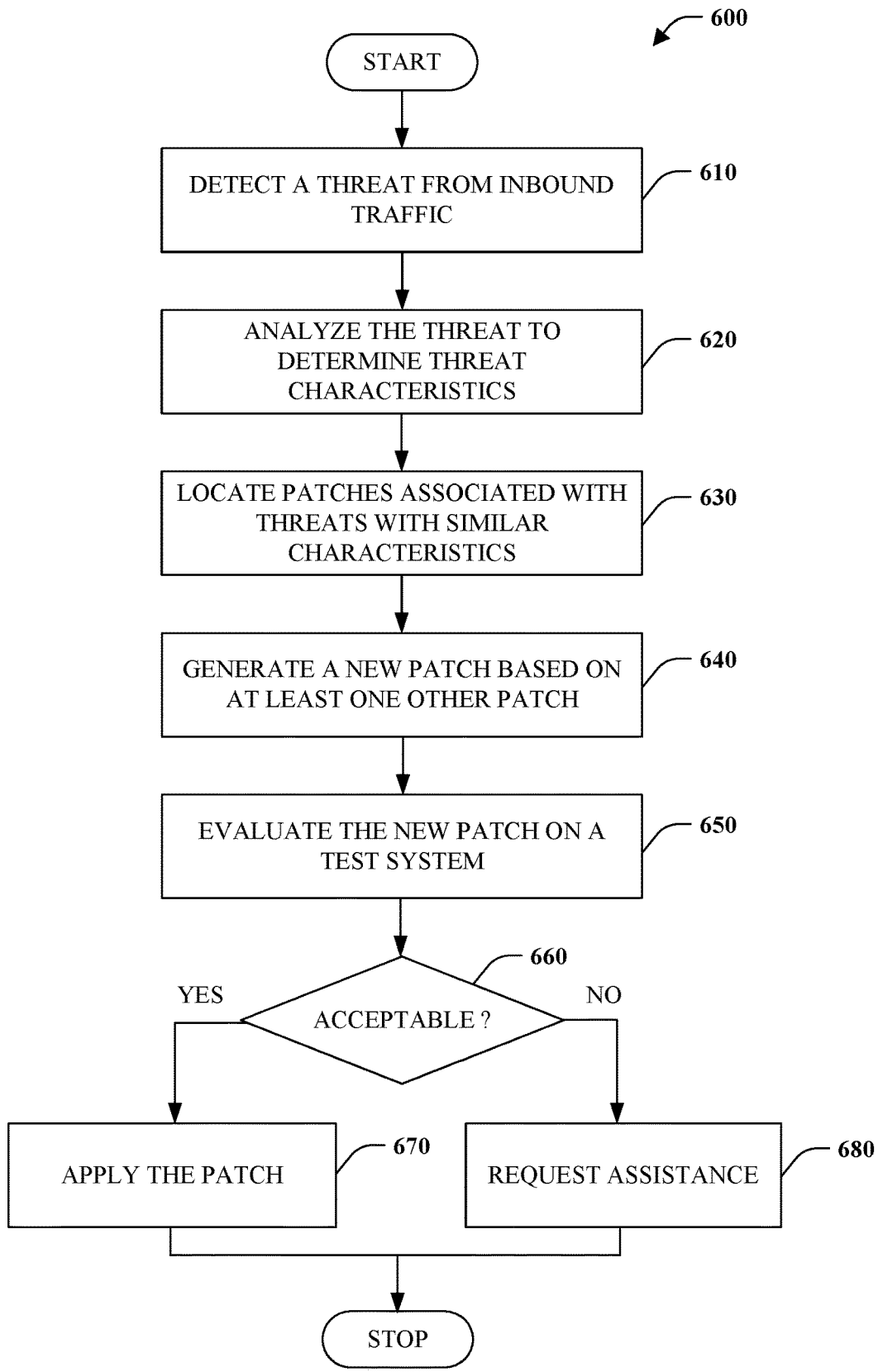
FIG. 6 is a flow chart diagram of a method of threat detection and remediation.

In view of the example systems described above, methods that may be implemented in accordance with the disclosed subject matter will be better appreciated with reference to flow chart diagrams of FIGS. 5 and 6. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 5 illustrates a method 500 of threat detection and remediation in accordance with one aspect of this disclosure. The method 500 can be performed by the threat system 120 and components thereof including the analysis component 210 and the remediation component 220. In one instance, operations described below can be implemented by way of execution of program instructions on a processor.

At reference numeral 510, a threat can be identified from inbound network traffic. In one instance, an enterprise network can be monitored. Incoming communication on the network, for example, seeking service from an enterprise server, are analyzed to detect potential threats to the server. A threat signature can be utilized in one embodiment to identify the threat in one scenario. The threat signature can come from prior direct experience or from a third party, service, or another entity. Alternatively, a threat can be identified based on variance in performance from a typical baseline.

At numeral 520, the threat is identified as known. A threat can be known or unknown. A known threat is one that recognized and for which a patch has been previously generated. An unknown threat is one that is not recognized and for which no patch currently exists. Here, the threat is identified as known, for example based on values of parameters or other information in a threat database.

At 530, a patch is identified that addresses the known threat. In accordance with one embodiment, a threat definition can be retrieved from a threat database. The threat definition can comprise information about the threat including parameter values and a patch for the threat or a link to a patch for the threat.

At reference numeral 540, the identified patch is applied to an effected system, such as a server. For example, the patch can be provided to a bank server and scheduled for installation. In one instance, the patch can be applied to make changes to the kernel of a server operating system to protect against a corresponding threat or remove or mitigate effects of the threat on the server.

FIG. 6 is a method 600 of threat detection and remediation that can be executed by the threat system 120 and components thereof. In one situation, a processor can execute instructions associated with computer executable components that perform operations described below. Unlike method 500 of FIG. 5, which dealt with a known threat, method 600 pertains to an unknown threat. Here, unknown threat refers to a threat that is not recognized and for which a patch does not currently exist.

At reference numeral 610, a threat is detected from inbound network traffic. Incoming communications to a server, for example, can be monitored. Further, the communication can be analyzed to determine whether or not a threat is present. For instance, network traffic can be analyzed to determine the impact the network traffic has on a target computer system. As an example, if central processing unit usage or memory consumption changes substantially from a threshold or baseline, a threat may be determined to be present. Of course, the threat need not be detected solely from network traffic. In one alternative, the threat may be identified by a person or entity and is not currently affecting the system.

At 620, a detected threat is analyzed to determine characteristics of the unknown threat. In one embodiment, values of parameters can capture characteristics, wherein the parameters pertain to threat history, central processor usage, network performance, and memory consumption trends, among others.

At numeral 630, patches associated with similar threats are identified. In one instance, a threat database can be queried to locate similar threats. For example, the database can be queried from identification of threats that have similar characteristics or parameter values. In one instance, a similarity score can be computed, and a predetermined threshold employed to reduce the number of similar threats to those with the most similarity above the threshold. In one instance, a machine learning classifier can be developed and trained to automatically determine a similarity score and identify the most similar threats.

At reference 640, a new patch is generated for the threat based on at least one other patch. In accordance with an aspect, one or more patches associated with identified similar threats can be utilized as a basis for generating the new patch. For example, if the threat is characterized by substantial memory consumption, a previous patch associated with a threat with the same characteristic can be employed at least as a basis for the new patch. In another example, if the threat is associated with multiple characteristics, such as substantial processor usage and memory consumption, previous patches dealing with each of these characteristics can be utilized to generate a potential hybrid of the previous patches. This approach exploits prior work associated with previous patches. Of course, a new patch can be generated from scratch without reference to previous patches.

Regardless of approach, in accordance with one embodiment, a machine learning model can be developed and trained to automatically generate a new patch based on historical training data. For instance, threat definitions associated with known threats and corresponding patches can be utilized to train the model. Subsequently, the model can be employed to cause a patch to be generated automatically based on characteristics of an unknown threat including parameter values as well as other information such as threat type (e.g., denial of service, spoofed identity, corruption . . . ).

At reference 650, the new patch that was generated can be evaluated on a test system. The evaluation can involve a determination as to whether or not the patch is acceptable in that it eliminates or at least mitigates the corresponding threat. Further, the patch can be evaluated to determine whether system performance is hindered by the patch. More specifically, a check can ensure that the patch does not cause an application to perform poorly or break the application or function associated with the application. In one embodiment, a score can be determined that captures numerically the effectiveness and performance of the new patch with respect to a threat.

At 660, a determination is made as to whether or not the patch is acceptable with respect to a threat. In other words, the determination concerns evaluating the efficacy and performance of the patch with respect to an acceptable standard. In accordance with one embodiment, the score generated, at 650, can be compared with a threshold value to determine whether or not the patch is acceptable at 660. If the patch is deemed acceptable ("YES"), the method continues at 670. By contrast, if the patch is deemed unacceptable ("NO"), the method can proceed at 680.

At numeral 670, the newly generated patch can be applied. For example, a new patch can be provided and scheduled for execution to modify an enterprise server. In one instance, the new patch can modify or alter an operating system kernel, or other higher level in a software stack, to prevent or remediate at threat. Further, it should be appreciated that a new entry into a threat database can be added corresponding to the threat and new patch such that the patch can be utilize by others in the future to address a known threat or utilized to generate another patch for an unknown threat.

At reference numeral 680, assistance can be requested for cases in which the automatically generated patch does not achieve acceptable performance. For instance, a threat administrator, or the like, can be contacted to address the problem. In response, an administrator can manually modify the new patch or generate an entirely new patch to achieve acceptable performance.

Aspects of the subject disclosure concern a technical problem concerning vulnerability of a computer system to breaches in security and possible harm associated with such breaches. Conventional development and implementation of security strategies by way of manual intervention lacks the expeditiousness to successfully combat constantly evolving threats. The technical solution involves continuous monitoring associated with detection of threats to computer systems and automatic identification and application of a patch. Further, in one instance the patch to address a particular threat can be automatically generated, for example based on prior threats and corresponding patches. Furthermore, machine learning can be injected within the process to facilitate threat detection and avoidance by way of patch generation and application, among other things.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
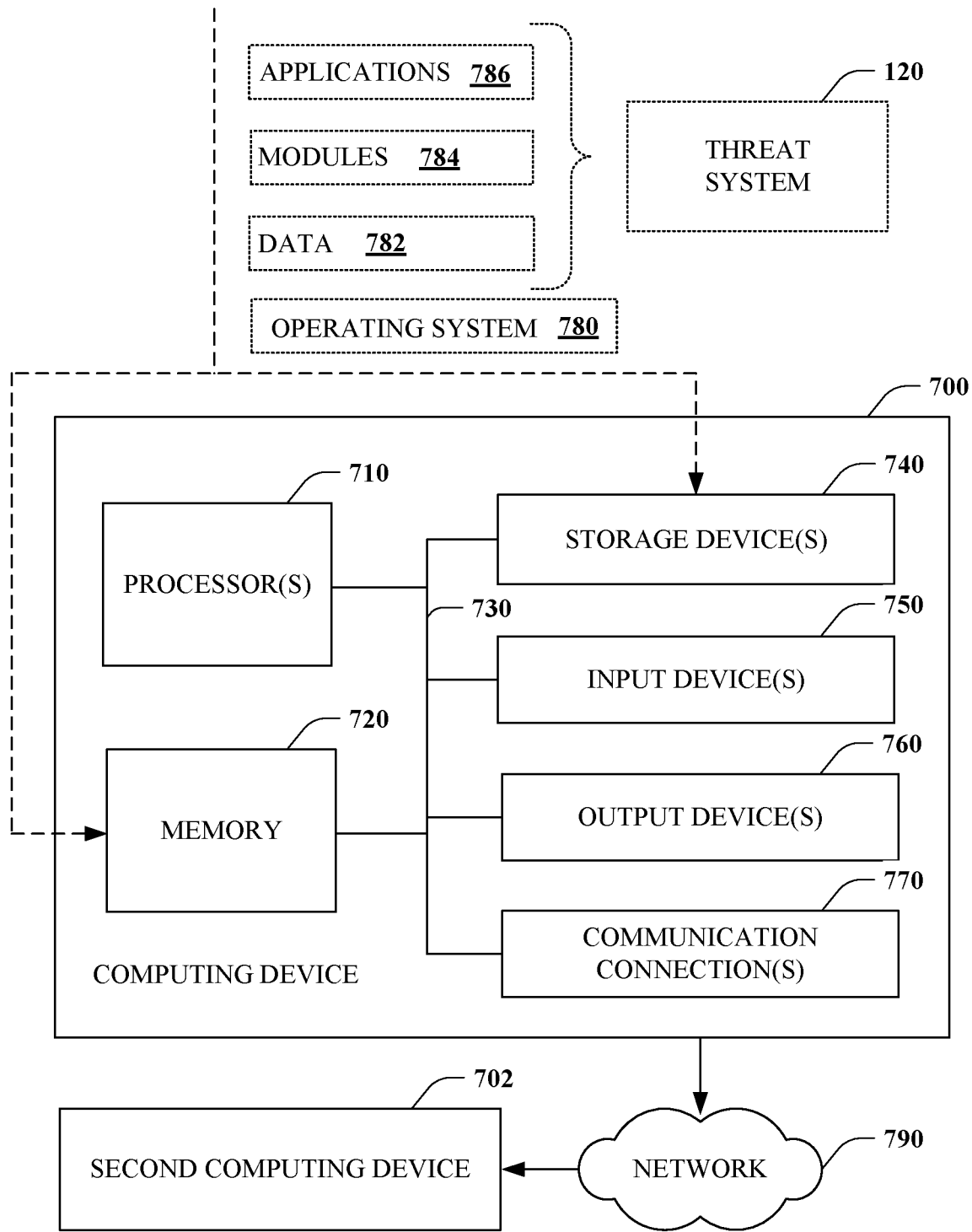
FIG. 7 is a schematic block diagram illustrating a suitable operating environment for aspects of the subject disclosure.

To provide a context for the disclosed subject matter, FIG. 7 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 7, illustrated is an example computing device 700 (e.g., desktop, laptop, tablet, watch, server, hand-held, programmable consumer or industrial electronics, set-top box, game system, compute node . . . ). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more processors 710 coupled to memory 720, wherein the one or more processors 710 execute various computer executable actions, instructions, and or components stored in the memory 720.

The processor(s) 710 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 710 can be a graphics processor unit (GPU) that performs calculations with respect to digital image processing and computer graphics.

The computing device 700 can include or otherwise interact with a variety of computer-readable media to facilitate control of the computing device to implement one or more aspects of the disclosed subject matter. The computer-readable media can be any available media that is accessible to the computing device 700 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 700. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 720 and storage device(s) 740 are examples of computer-readable storage media. Depending on the configuration and type of computing device, the memory 720 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 700, such as during start-up, can be stored in nonvolatile memory, while volatile memory can act as external cache memory to facilitate processing by the processor(s) 710, among other things.

The storage device(s) 740 include removable/non-removable, volatile/non-volatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 720 and storage device(s) 740 can include, or have stored therein, operating system 780, one or more applications 786, one or more program modules 784, and data 782. The operating system 780 acts to control and allocate resources of the computing device 700. Applications 786 include one or both of system and application software and can exploit management of resources by the operating system 780 through program modules 784 and data 782 stored in the memory 720 and/or storage device(s) 740 to perform one or more actions. Accordingly, applications 786 can turn a general-purpose computer 700 into a specialized machine in accordance with the logic provided thereby.

All or portions of the disclosed subject matter can be implemented using standard programming and/or engineering techniques to produce software, firmware, hardware, or any combination thereof to control the computing device 700 to realize the disclosed functionality. By way of example and not limitation, all or portions of the threat system 120 can be, or form part of, the application 786, and include one or more modules 784 and data 782 stored in memory and/or storage device(s) 740 whose functionality can be realized when executed by one or more processor(s) 710.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the threat system 120 and/or functionality associated therewith can be embedded within hardware in an SOC architecture.

The input device(s) 750 and output device(s) 760 can be communicatively coupled to the computing device 700. By way of example, the input device(s) 750 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 can be connected to the computing device 700 by way of wired connection (e.g., bus), wireless connection (e.g., Wi-Fi, Bluetooth . . . ), or a combination thereof.

The computing device 700 can also include communication connection(s) 770 to enable communication with at least a second computing device 702 by means of a network 790. The communication connection(s) 770 can include wired or wireless communication mechanisms to support network communication. The network 790 can correspond to a local area network (LAN) or a wide area network (WAN) such as the Internet. The second computing device 702 can be another processor-based device with which the computing device 700 can interact. In one instance, the network 790 can correspond to the enterprise network 100 of FIG. 1. Similarly, the computing device 700 can implement functionality associated with the threat system 120 and the second computing device 702 can correspond to an enterprise server such as, but not limited to, a financial institution server that provides banking services.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
    a processor coupled to a memory that includes instructions, that when executed by the processor, cause the processor to:
        detect a first threat based on analysis of a first plurality of parameter values of inbound traffic to an enterprise network;
        automatically determine based on the first plurality of parameter values a first patch that mitigates the first threat on a computing resource in the enterprise network;
        detect a second threat based on analysis of a second plurality of parameter values;
        when the first plurality of parameter values and the second plurality of parameter values have one or more parameter values in common, automatically generate a second patch for the second threat based in part on a portion of the first patch and the second plurality of parameter values; and
        convey the second patch to the computing resource for application;
        generate a third patch for an unknown threat from at least one existing patch associated with a known threat;
        identify one or more parameter values associated with the at least one existing patch;
        compute a similarity score based on a result of a comparison of the one or more parameter values for associated with the threat and the one or more parameter values associated with the at least one existing patch; and
        determine the at least one existing patch based on comparison of the similarity score to a predetermined threshold.

2. The system of claim 1, wherein the instructions further cause the processor to determine the patch by matching at least one of the first plurality of parameter values of the inbound traffic to one or more parameter values of a known threat and corresponding patch.

3. The system of claim 1, wherein the instructions further cause the processor to:
    evaluate effectiveness of the patch with respect to the threat; and
    notify a user when the effectiveness is below a predetermined threshold.

4. The system of claim 1, wherein the instructions further cause the processor to analyze the inbound traffic in a test environment that is separate from the computing resource.

5. The system of claim 1, wherein the instructions further cause the processor to detect the threat prior to the threat affecting the computer resource.

6. The system of claim 1, wherein the computer resource is a server and the patch is applied to a kernel of the server.

7. The system of claim 1, wherein the analysis of the first plurality of parameter values determines an impact on the enterprise network.

8. A method, comprising:
    monitoring inbound traffic to an enterprise network;
    detecting a first threat based on analysis of a first plurality of parameter values of the inbound traffic;
    automatically determining based on the first plurality of parameter values a first patch that mitigates the first threat on a computing resource in the enterprise network;
    detecting a second threat based on analysis of a second plurality of parameter values;
    when the first plurality of parameter values and the second plurality of parameter values have one or more parameter values in common, automatically generating a second patch for the second threat based in part on a portion of the first patch and the second plurality of parameter values;
    providing the second patch to the computing resource for deployment of the patch on the computing resource;
    generating a third patch for an unknown threat from at least one existing patch associated with a known threat;
    identifying one or more parameter values associated with the at least one existing patch;
    computing a similarity score based on a result of a comparison of the one or more parameter values for associated with the threat and the one or more parameter values associated with the at least one existing patch; and
    determining the at least one existing patch based on comparison of the similarity score to a predetermined threshold.

9. The method of claim 8, further comprising determining the patch by matching at least one of the first plurality of parameter values of the inbound traffic to a known threat and corresponding patch.

10. The method of claim 8, further comprising:
predicting effectiveness of the patch with respect to the threat; and
notifying a user when the effectiveness is below a predetermined threshold.

11. The method of claim 10, further comprising updating the patch based on input received from the user.

12. The method of claim 8, further comprising:
analyzing the inbound traffic in a test environment that is separate from the computing resource, wherein the analysis of the one or more parameter values determines an impact on the enterprise network.

13. A method, comprising:
executing, on a processor, instructions that cause the processor to perform operations comprising:
monitoring inbound traffic to an enterprise network;
detecting presence of an unknown threat, prior to the unknown threat impacting an enterprise server, based on analysis of values of a first plurality of parameters of the inbound traffic;
identifying at least one first patch associated with a threat based on the first plurality of parameter values;
detecting a second threat based on analysis of a second plurality of parameter values;
when the first plurality of parameter values and the second plurality of parameter values have one or more parameter values in common, automatically generating a second patch for the second threat based in part on a portion of the at least one patch to address the unknown threat and the second plurality of parameter values;
conveying the second patch for application on a kernel of the enterprise server;
generating a third patch for an unknown threat from at least one existing patch associated with a known threat;
identifying one or more parameter values associated with the at least one existing patch;
computing a similarity score based on a result of a comparison of the one or more parameter values for associated with the threat and the one or more parameter values associated with the at least one existing patch; and
determining the at least one existing patch based on comparison of the similarity score to a predetermined threshold.

14. The method of claim 13, the operations further comprising:
predicting effectiveness of the at least one first patch with respect to the threat; and
notifying a user when the effectiveness is below a predetermined threshold.

15. The method of claim 14, the operations further comprising updating the at least one first patch based on input received from the user.

* * * * *